United States Patent [19]

Fassell

[11] 3,852,124

[45] Dec. 3, 1974

[54] DUPLEX SEALING PROCESS
[75] Inventor: Wayne M. Fassell, Newport Beach, Calif.
[73] Assignee: Philco-Ford Corporation, Blue Bell, Pa.
[22] Filed: Sept. 22, 1972
[21] Appl. No.: 291,249

[52] U.S. Cl............. 148/6.15, 148/6.16, 148/6.14, 204/35 N, 204/38 A
[51] Int. Cl. ........ C23c 1/10, C23f 7/08, C23b 5/50
[58] Field of Search ......... 148/6.15 R, 6.15 Z, 6.16; 204/35 N, 38 A

[56] References Cited
UNITED STATES PATENTS

| | | | |
|---|---|---|---|
| 3,099,610 | 7/1963 | Cybriwsky et al. | 204/35 N |
| 3,382,160 | 5/1968 | Asada et al. | 204/38 A |
| 3,735,484 | 5/1973 | Gurev et al. | 148/6.15 R |

*Primary Examiner*—John D. Welsh
*Attorney, Agent, or Firm*—Robert D. Sanborn; William F. Johnson

[57] ABSTRACT

An anodized aluminum coating is sealed by a duplex process that comprises immersing the coating in a solution containing a divalent metal cation such as iron, cobalt or nickel followed by immersing the coating in a solution containing a multivalent anion such as phosphate, silicate, molybdate or chromate. The resulting seal imparts greatly improved corrosion resistance to the coating.

10 Claims, No Drawings

DUPLEX SEALING PROCESS

BACKGROUND OF THE INVENTION

Anodized coatings are produced on aluminum and aluminum alloys for functional purposes such as increased corrosion resistance, electrical insulation, abrasion resistance, chemical inertness and adsorption, or for purely decorative purposes since the anodized coating generally is visually aesthetic. Improved aesthetics can be achieved readily since the anodized coating adsorbs any of a wide variety of dyes or other coloring agents. Excellent adhesion also can be obtained between ordinary paints and the anodized coatings.

An anodized aluminum coating typically is extremely porous and various techniques have been developed for sealing the anodized coating to prevent corrosive attack and improve coating durability. The usual sealing process involves a one-step immersion of the coating in boiling water or a solution of potassium dichromate, sodium molybdate, sodium dihydrogen phosphate or nickel acetate. Such one-step operations do in fact produce significant sealing of the anodized coating and result in improved corrosion resistance.

SUMMARY OF THE INVENTION

This invention provides a surprising improvement on the one-step sealing processes of the prior art by a duplex or two-step process that comprises first immersing the anodized coating in a solution of a salt that dissociates in the solution to produce a divalent metal cation, and subsequently immersing the coating into a second solution of a salt that dissociates to produce a multivalent anion. The first solution is free of multivalent anions containing atoms of oxygen and atoms of molybdenum phosphorous, silicon, chlorine or chromium. One of these multivalent anions must be present in the second solution which can contain monovalent cations but preferably is free of any significant amount of divalent metal cations.

An aqueous solvent typically is used for each of the solutions. Typical divalent metal cations for the first solution include divalent cations of iron, cobalt, nickel, lead, magnesium, zinc, cadmium, barium, calcium, copper, manganese, strontium and tin. A dissociative organic salt of the divalent metal such as its acetate or propionate or a dissociative inorganic salt such as its sulfate, chloride, bromide, iodide, or nitrate can be used to produce the first solution. During immersion of the anodized coating in the first solution, the first solution typically is maintained within a temperature range of about 120°F - 200°F and within a pH range of about 2 - 6.5. Best results are achieved with a divalent metal cation of iron, cobalt or nickel. Tests indicate that maintaining the first solution within a temperature range of about 160°F - 180°F during the immersion optimizes the resulting corrosion resistance.

A typical multivalent anion useful in the second solution includes molybdate, acid phosphate, phosphate, chromate and dichromate, silicate and chlorate. The second solution preferably is made from a salt that dissociates into the multivalent anion and a monovalent cation, such as the sodium or ammonium salt of the anion. During immersion of the anodized coating in the second solution, the temperature of the second solution preferably is maintained within a temperature range of about 140°F - 212°F and a pH range of about 2 - 10. Tests indicate that optimum corrosion resistance is achieved when the second solution is maintained at a higher temperature than the first solution.

Careful rinsing is conducted between immersion in the first solution and the second solution of the process of this invention to avoid contamination of the second solution with any of the divalent metal cations from the first solution. Other supporting operations typically used in sealing anodized coatings also can be conducted. The process apparently is effective on anodized coatings produced by any known technique; anodized coatings produced in typical acid anodizing baths such as sulfuric acid, phosphoic acid or oxalic acid exhibit no significant variations in the effectiveness of the process.

One important advantage of the process is its ability to produce a colorless seal having extremely good corrosion resistance. Such colorless seals can be produced with any of the aforementioned solutions except those in which the second solution contains chromate or dichromate multivalent anions. Minor shading can be achieved if desired with certain of the other solutions; for example the use of certain concentrations of ferrous ammonium sulfate in the first solution can produce a tan shape.

Analysis indicates that the mechanism of the duplex sealing process of this invention is based on the apparent availability of two types of adsorption sites in the anodized coating. One of the sites appears to be a divalent cation acceptor type whereas the second is a multivalent anion acceptor type. The duplex process of the invention satisfies both of the sites and reduces the molecular spacing in the anodized coating to the point where the diffusion rate of corrosion causing agents is diminished considerably. Reversing the sequence of the steps of the process produces inferior corrosion resistance as does combining the divalent metal cations with the multivalent anions in the same solution. The reason for this is uncertain although it is theorized that the multivalent anions tend to block at least temporarily the cation acceptor sites, and thus leave spaces susceptible to corrosion causing agents.

DETAILED DESCRIPTION

The solutions for carrying out the duplex process of this invention are prepared in a conventional manner by dissolving appropriate salts in water. Typical concentrations range from about 1 to 7 grams of salt per liter. The solutions are then heated to the operating temperatures.

Panels of various aluminum alloys including nos. 2024, 6061 and 7075 were treated in the first and second solutions listed in Table I. None of the anodized coatings failed from corrosion when exposed for 240 hours to a 5 percent salt fog in accordance with Federal Test Method Standard 141.

TABLE I

| First Solution | | Second Solution | |
|---|---|---|---|
| Salt and conc. | Temp. and time | Salt and conc. | Temp. and time |
| $Ni(C_2H_3O_2)_2$, 1.25g/l | 160°F 10 min. | $Na_2MoO_4 \cdot 2H_2O$, 6.5g/l | 180°F 2 min. |
| $Co(C_2H_3O_2)_2$, 1.25g/l | 160°F 10 min. | $Na_2MoO_4 \cdot 2H_2O$, 6.5g/l | 160°F 2 min. |
| $FeSO_4(NH_4)SO_4$, 1.25g/l | 160°F 10 min. | $Na_2MoO_4 \cdot 2H_2O$, 6.5g/l | 160°F 2 min. |

TABLE I—Continued

| First Solution | | Second Solution | |
|---|---|---|---|
| Salt and conc. | Temp. and time | Salt and conc. | Temp. and time |
| Pb(C$_2$H$_3$O$_2$)$_2$, 2.5g/l | 160°F 10 min. | Na$_2$MoO$_4$.2H$_2$O, 6.5g/l | 160°F 2 min. |
| Mg(C$_2$H$_3$O$_2$)$_2$, 1.25g/l | 160°F 10 min. | Na$_2$MoO$_4$.2H$_2$O, 6.5g/l | 160°F 2 min. |
| Zn(C$_2$H$_3$O$_2$)$_2$, 1.25g/l | 160°F 10 min. | Na$_2$MoO$_4$.2H$_2$O, 6.5g/l | 160°F 2 min. |
| Cd(C$_2$H$_3$O$_2$)$_2$, 1.25g/l | 160°F 10 min. | Na$_2$MoO$_4$.2H$_2$O, 6.5g/l | 160°F 2 min. |
| Ni(C$_2$H$_3$O$_2$)$_2$, 1.25g/l | 160°F 10 min. | K H$_2$PO$_4$, 4.12g/l | 160°F 2 min. |
| Ni(C$_2$H$_3$O$_2$)$_2$, 1.25g/l | 160°F 10 min. | K$_3$PO$_4$, 4.12g/l | 160°F 2 min. |
| Ni(C$_2$H$_3$O$_2$)$_2$, 1.25g/l | 160°F 10 min. | Na$_2$Cr$_2$O$_7$, 4.12g/l | 160°F 2 min. |

For comparative purposes, panels treated according to the duplex process of this invention were tested along with panels treated with either one of the solutions and with panels sealed with pure deionized water. The panels were exposed to N$_2$O$_4$ in the presence of water vapor (approximately 2 ml of N$_2$O$_4$ and 2 ml of water vapor at 70°F) for one hour, and then were subjected to 240 hours of exposure to 5 percent salt fog in accordance with Federal Test Method 141. Table 2 lists the test results. Note that test number 4 and 5, which were treated with the duplex process of this invention, exhibited a failure frequency well below the frequency obtained with the other tests.

TABLE II

| Test No. | First Solution | Second Solution | Percent of failed samples |
|---|---|---|---|
| 1 | Na$_2$Cr$_2$O$_7$ | None | 92.6 |
| 2 | Na$_2$Cr$_2$O$_7$ | Deionized H$_2$O | 84.0 |
| 3 | Na$_2$Cr$_2$O$_7$ | Ni(C$_2$H$_3$O$_2$)$_2$ | 87.0 |
| 4 | Ni(C$_2$H$_3$O$_2$)$_2$ | Na$_2$Cr$_2$O$_7$ | 5.5 |
| 5 | Ba(C$_2$H$_3$O$_2$)$_2$ | Na$_2$Cr$_2$O$_7$ | 48.2 |
| 6 | Deionized H$_2$O at 198–212°F | None | 96.2 |
| 7 | Ni(C$_2$H$_3$O$_2$)$_2$ | None | 94.4 |

Thus the duplex sealing process of this invention provides greatly improved corrosion resistance for anodized aluminum coatings. The duplex process is capable of producing colorless seal coatings and is particularly useful on anodized articles intended for the heavy service encountered in automotive applications.

I claim:

1. A process for improving the corrosion resistance of an anodized aluminum coating of an aluminum based article comprising:
   a. contacting said anodized coating with a first aqueous solution of salt selected from the group consisting of acetates, propionates, sulphates, chlorides, bromides, iodides and nitrates, which salt disassociates in water to form a divalent cation selected from the group consisting of iron, cobalt, nickel, lead, magnesium, zinc, cadmium, barium, calcium, copper, manganese, strontium and tin;
   b. rinsing said anodized coating; and
   c. contacting said anodized coating with a second aqueous solution of a sodium, potassium or ammonium salt which disassociates in water to form an anion selected from molybdate, acid phosphate, phosphate, chromate, dichromate, silicate and chlorate.

2. The process of claim 1 wherein said first aqueous solution is maintained within a pH range of about 2 to about 6.5 during contact with said anodized coating and said second aqueous solution is maintained within a pH range of about 2 to about 10 during contact with said anodized coating.

3. The process of claim 1 wherein said second aqueous solution is maintained at a higher temperature than said first aqueous solution during contact with said anodized coating.

4. The process of claim 1 wherein said anodized coating is contacted with said first and second aqueous solutions by immersing said aluminum based article in said solutions.

5. The process of claim 4 wherein said first aqeuous solution is maintained within a temperature range of about 120°F to about 200°F during immersion therein of said aluminum based article, and said second solution is maintained within a temperature range of about 140°F to about 212°F during immersion therein of said aluminum based article.

6. The process of claim 5 wherein said first aqueous solution is maintained within a pH range of about 2 to about 6.5 during immersion therein of said aluminum based article and said second aqueous solution is maintained within a pH range of about 2 to about 10 during immersion therein of said aluminum based article.

7. The process of claim 6 wherein the cation of said first solution is a divalent cation of iron, cobalt or nickel and the anion of the second aqueous solution is selected from the group consisting of molybdate, acid phosphate, silicate, chromate and dichromate.

8. The process of claim 7 wherein said second aqueous solution is maintained at a higher temperature than said first aqueous solution during immersion of said aluminum based article in the respective solutions.

9. The process of claim 1 wherein the cation of said first aqueous solution is a divalent cation of iron, cobalt or nickel.

10. The process of claim 1 wherein the anion of said second aqueous solution is selected from the group consisting of molybdate, acid phosphate, silicate, chromate and dichromate.

* * * * *